United States Patent [19]
Furuya

[11] Patent Number: 5,669,410
[45] Date of Patent: Sep. 23, 1997

[54] AIR FLOW RATE REGULATION APPARATUS FOR AIR PUMP

[75] Inventor: Shouichi Furuya, Yokohama, Japan

[73] Assignee: Toshiro Shimizu, Yamanashi-ken, Japan

[21] Appl. No.: 526,399

[22] Filed: Sep. 11, 1995

[30] Foreign Application Priority Data

Sep. 22, 1994 [JP] Japan .................................. 6-266032
Mar. 7, 1995 [JP] Japan .................................. 7-003142 U

[51] Int. Cl.$^6$ ...................................................... F16K 5/10
[52] U.S. Cl. ............................ 137/511; 137/539; 251/208; 119/245
[58] Field of Search .................................. 251/208, 209; 119/263, 245; 137/511, 535, 539

[56] References Cited

U.S. PATENT DOCUMENTS 4,177,947  12/1979  Menzel ..................... 251/209 X Primary Examiner—Kevin Lee
Attorney, Agent, or Firm—Keck, Mahin & Cate

[57] ABSTRACT

An air flow rate regulation apparatus is used for regulating a flow rate of discharge air of an air pump used for breeding aquarium fishes. The apparatus includes a cylindrical control member having a hollow chamber defined thereinside and a regulation hole formed in the outer peripheral surface thereof and a cylindrical regulation member having a regulation recess overlapping with the regulation hole and made of a flexible material. The regulation member is rotatably fitted over the outer peripheral surface of the control member so as to adjustably cover the regulation hole, and the overlapped area of the regulation hole and the regulation recess is increased or decreased by rotating the control member and the regulation member relative to each other so that the overlap area can be continuously increased or decreased over a broad range of the rotating angle, 90° or larger, of the control member and the regulation member. A back flow prevention device having check valve device can be fitted to the inflow port side or the outflow port side inside the control member.

9 Claims, 5 Drawing Sheets

AIR FLOW RATE REGULATION APPARATUS FOR AIR PUMP

BACKGROUND OF THE INVENTION

This invention relates to an air flow rate regulation apparatus capable of regulating a discharge quantity of air of an air pump used for keeping aquarium fishes, or the like. More particularly, the present invention provides an air flow rate regulation apparatus including a cylindrical control member fitted either directly or indirectly to the air pump described above and having a regulation hole formed in the outer peripheral surface thereof, and a regulation member having a regulation recess coming into contact with the outer peripheral surface of the control member, wherein the discharge volume of air is regulated by the interaction between the control member and the regulation member.

An air pump P used for keeping aquarium fishes supplies air discharged from a discharge port 1 to an air flow rate regulation apparatus A and to a bubbler 3 through a tube to discharge air in, the water inside a water tank 4 and agitate water and supply oxygen, as shown in FIG. 13A. Symbol B in the drawing represents a back flow prevention device, which is not always indispensable and can be omitted, whenever not required.

FIG. 13B shows another example of the type wherein the air flow rate regulation apparatus A is disposed at an intermediate portion of the tube 2. The apparatus A employs the structure including an inflow port 5 and an outflow port 6, both of which protrude outward, and a control member 8 having a regulation member 7 rotatably fitted thereto at the center portion thereof. A round regulation hole 9 penetrates through the regulation member 7 fitted to the control member 8, and the overlapped area of the round inflow port 5 and the outflow port 6, that are disposed on the regulation member 7 on a straight line, is changed by rotating a rod 10 of the control member 8 so as to directly regulate the quantity of air to be discharged.

Another prior art example of the air flow rate regulation apparatus has a unitary structure wherein the control member 8 is directly fitted to the discharge port 3 of the air pump as shown in FIG. 13C. In this example, a round regulation hole 9 communicating with the discharge port 3 is bored in the outer peripheral surface 11 of the control member 8, and the regulation member 7 is so fitted as to cover this regulation hole 9. When the regulation member 7 is rotated, the overlapped area of the regulation hole 9 and the regulation recess 12 formed on the back of the regulation member 7 is changed, so that a part of air discharged from the regulation recess 12 is discharged outside from the discharge opening 13 and the final air discharge quantity is regulated.

Besides the prior art examples described above, various other methods have been employed such as a mechanical method which changes the gap between a permanent magnet and a solenoid coil as a driving mechanism of the air pump is changed to cause the change of the mutual magnetic force and a method which connects in series a variable resistor with a solenoid coil, increases or decreases an electromagnetic force by changing a current, and electrically changes the driving force so as to change the discharge air quantity.

The final air discharge quantity of the air pump used for keeping aquarium fishes, etc, is regulated in accordance with the size of the water tank or is regulated so that the water stream becomes weak at the time of feed. In other words, the air pump is used while being adjusted delicately.

In the structure shown in FIG. 13B, however, regulation is made by the change of the overlap area of the round regulation hole 9 and the round inflow port 5 and outflow port 6 disposed in the regulation member 7. Since the overlap surfaces are round in either hole, the overlap area greatly changes even with a slight change of the rotating angle, and fine adjustment is difficult because a great volume of air greater than is necessary is discharged or the hole is completely closed.

In the structure shown in FIG. 13C, too, the overlapped area of the regulation hole 9 and the regulation recess 12 is changed by rotating the regulation member 7 and outflow air is discharged by this change in the same way as in the example given above. However, from the aspect of the strength, it is structurally difficult to define a large hole exceeding ¼ of the outer peripheral surface 11 of the control member 8, that is, beyond 90°. For this reason, the area change is great with even a slight change of the rotating angle between the regulation hole 9 and the regulation recess 12, and fine adjustment has been difficult.

SUMMARY OF THE INVENTION

The present invention is completed with the technical background described above, and is mainly directed to providing an air flow rate regulation apparatus which can secure a rotating angle of more than 90° of a control member and a regulation member, and can easily regulate finely the discharge air volume by continuously increasing or decreasing the overlapped area of a regulation hole and a regulation recess.

It is another object of the present invention to provide an air flow rate regulation apparatus equipped integrally with a back flow prevention device, and capable of easily and finely regulating a discharge air volume.

It is still another object of the present invention to provide an air flow rate regulation apparatus having a built-in back flow prevention function and a simple structure.

According to an aspect of the present invention, there is provided an air flow rate regulation apparatus for regulating the flow rate of discharge air of an air pump used for keeping aquarium fishes, including a cylindrical control member having a hollow chamber thereinside and a regulation hole bored in the outer peripheral surface thereof and a cylindrical regulation member equipped with a regulation recess overlapping with the regulation hole and made of a flexible material, wherein the regulation member is rotatably fitted over the outer peripheral surface of the control member in such a manner as to be capable of adjustably covering the regulation hole, and the control member and the regulation member are rotated relatively to each other so as to increase or decrease an overlapped area of the regulation hole and the regulation recess so that the overlap area can be increased or decreased continuously over a broad range of the rotating angle, 90° or larger, of the control member and the regulation member.

In the construction described above, the regulation hole comprises preferably an elongated hole having a small width and formed on the outer peripheral surface of the cylindrical control member in its circumferential or axial direction, or a plurality of small holes formed linearly. The regulation recess preferably has an elongated groove shape or a triangular shape overlapping with the regulation hole described above.

A back flow prevention device having check valve means may be fitted to the inflow port side or the outflow port side inside the control member.

BRIEF DESCRIPTION OF DRAWINGS

FIGS. 13A to 13C show the construction of an air flow rate regulation apparatus according to the prior art, wherein FIG. 13A is an explanatory view showing the state of use, FIG. 13B is a perspective view and FIG. 13C is a partial exploded perspective view.

PREFERRED EMBODIMENTS OF THE INVENTION

Hereinafter, preferred embodiments of the air flow rate regulation apparatus according to the present invention will be explained with reference to the accompanying drawings.

Figure 1:
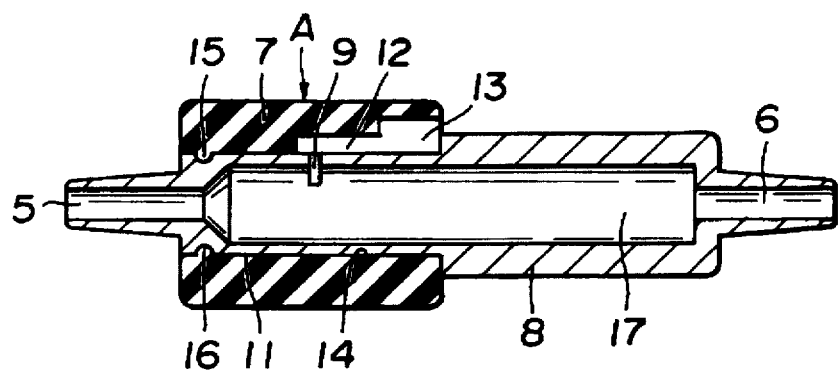
FIG. 1 is a sectional view of an air flow rate regulation apparatus according to a first embodiment of the present invention.
Figure 2:
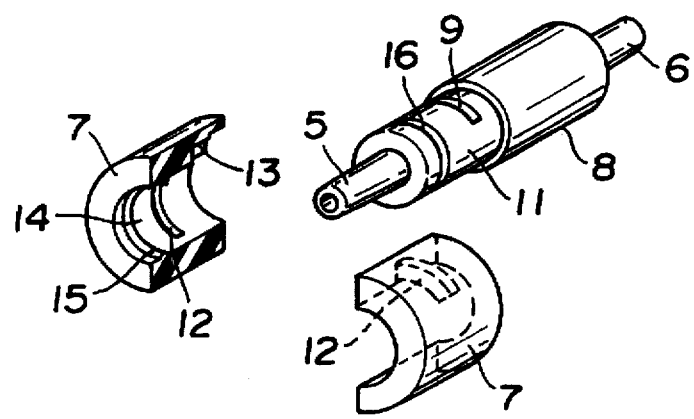
FIG. 2 is an exploded perspective view of the air flow rate regulation apparatus shown in FIG. 1.

Referring to FIGS. 1 and 2, an air flow rate regulation apparatus A includes a cylindrical control member 8 molded from a synthetic resin or a metal and a cylindrical regulation member 7 made of a flexible material and fitted over the outer peripheral surface 11 of the control member 8.

An inflow port 5 and an outflow port 6 are provided to respective ends of the control member 8 so as to connect to respective tubes 2 (see FIG. 13A), and communicate with each other by a hollow chamber 17 defined inside the control member 8.

A regulation hole 9 having a small width is bored in the outer peripheral surface 11 of the control member 8 within a range not exceeding the radius of the control member 8 in such a manner as to communicate with the hollow chamber 17.

The regulation member 7 is made of a flexible material such as a rubber or a synthetic resin, is cylindrical, and includes a regulation recess 12 formed in the inner peripheral surface thereof at the position overlapping the regulation hole 9 in the circumferential direction and within a range not exceeding the radius thereof, and a discharge opening 13 opening to the outer side surface of the regulation member 7 and continuing from the regulation recess 12. The regulation member 7 is fitted air-tight over the outer peripheral surface 11 of the control member 8. As shown in the drawings, an engagement protuberance 15 is formed on the inner peripheral surface 14 of the regulation member 7 and an engagement groove 16 mating with the engagement protuberance is formed in the outer peripheral surface 11 of the control member 8, so that when they are engaged with each other, they do not fall off from each other.

Figure 3:
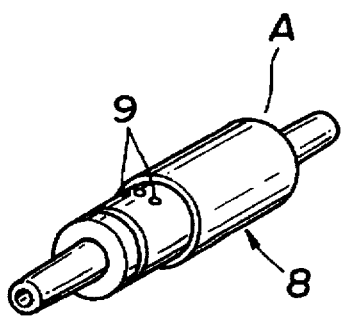
FIG. 3 is a perspective view of the air flow rate regulation apparatus according to a second embodiment of the present invention.

In FIG. 3 showing the second embodiment, the control member 8 has a plurality of small holes linearly bored in the circumferential direction within the range not exceeding the radius, as the regulation hole 9. The rest of the construction is the same as that of the first embodiment.

By the construction described above, the air flow rate regulation apparatus A of the present invention can discharge and supply air discharged from the discharge port 1 of the air pump from a bubbler 3 (see FIG. 13A) inside a tank 4 into the tank when the tubes 2 are connected to the inflow port 5 and the outflow port 6. When the regulation hole 9 and the regulation recess 12 do not overlap with each other, for example, the total quantity of discharged air is discharged from the outflow port 6 through the inflow part 5 and the hollow chamber 17, but when the regulation hole 9 in the form of the elongated hole having a small width or a plurality of small holes aligned linearly and the regulation recess 12 are caused to overlap with each other by rotating the regulation member 7, a part of air passing through the hollow chamber 17 flows out through the regulation recess 12 from the discharge opening 13. Accordingly, the volume of air discharged from the outflow port 6 decreases and furthermore, the volume of air discharged decreases in proportion to the increase of the overlap area until at last discharge and supply of air from the bubbler 3 stop.

Here, the increase or decrease of the volume of discharged air will be explained in further detail. When the regulation hole 9 overlaps with the regulation recess 12 and communication is established, the water pressure of water in which the bubbler 3 is disposed acts on the distal end of the outflow port 6 but because only the atmospheric pressure is applied to the discharge opening 13, air passes through the discharge opening 13 due to this pressure difference even though the area is small. In this instance, the regulation hole 9 is formed as the elongated hole having a small width in such a manner as to extend beyond 90° in the circumferential direction on the outer peripheral surface 11 of the control member 8 and furthermore, the regulation recess 12 is formed in the form of the elongated groove in such a manner as to extend beyond 90° in the circumferential direction in the inner peripheral surface 14 of the regulation member 7. Accordingly, the volume of discharge air can be finely adjusted continuously and easily over a rotating angle of 90° or larger. Incidentally, the same effect can be obtained by reversely connecting the inflow port 5 and the outputflow port 6.

Figure 4:
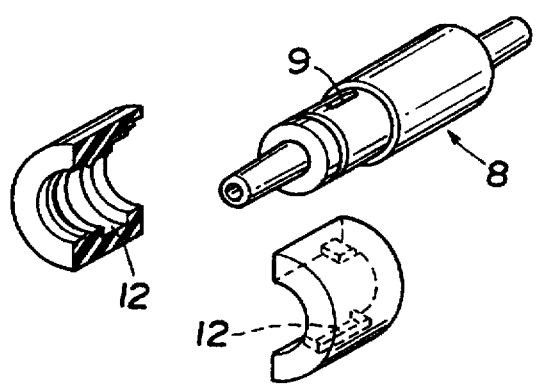
FIG. 4 is an exploded perspective view of the air flow rate regulation apparatus according to a third embodiment of the present invention.

FIG. 4 shows the third embodiment of the present invention. This embodiment is the same as the embodiment shown in FIG. 2 with the exception of the regulation hole 9 and the regulation recess 12. In other words, in the embodiment shown in FIG. 4, an elongated hole having a small width is formed in the outer peripheral surface 11 of the control member 8 in an axial direction as the regulation hole 9, and the regulation recess 12 is shaped on the inner peripheral surface 14 of the regulation member 7 into a triangle the maximum width of which is equal to that of the regulation hole 9 and the width of which becomes progressively smaller over a range of beyond 90° in the rotating direction. Accordingly, when the regulation member is rotated, the overlapped area of the elongated hole (regulation hole 9) having a small width and the triangular recess 12 changes. Because a part of air flowing through the hollow chamber 17 flows out through the regulation recess 12 from the discharge opening 13 in the same way as in the first embodiment shown in FIG. 2, the volume of air discharged from the discharge port 6 decreases, and the volume of air discharged can be finely regulated continuously and easily over the rotating angle of more than 90°.

Figure 5:
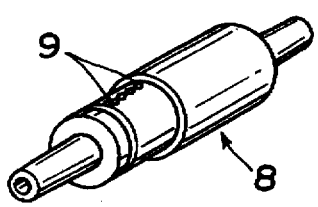
FIG. 5 is a perspective view of the air flow rate regulation apparatus according to a fourth embodiment of the present invention.

In FIG. 5 showing the fourth embodiment of the present invention, a plurality of small holes are linearly formed in the axial direction as the regulation hole 9 in place of the elongated hole 9 in the embodiment shown in FIG. 4. The rest of the construction is the same as that of the third embodiment described above.

The differences in boring direction of the regulation hole 9 and shape of the regulation recess 12 will be explained. When the regulation hole 9 is disposed in the circumferential direction and the regulation recess 12 is shaped into the elongated groove, the peripheral length of each of them must be from 90° to 180° because the position at which they do not overlap with each other must be secured. In contrast, when the regulation hole 9 is disposed in the axial direction and the regulation recess 12 is shaped into the triangular shape, substantially the whole periphery beyond 90° other than the width of the regulation hole 9 can be used as the regulation range.

Figure 6:
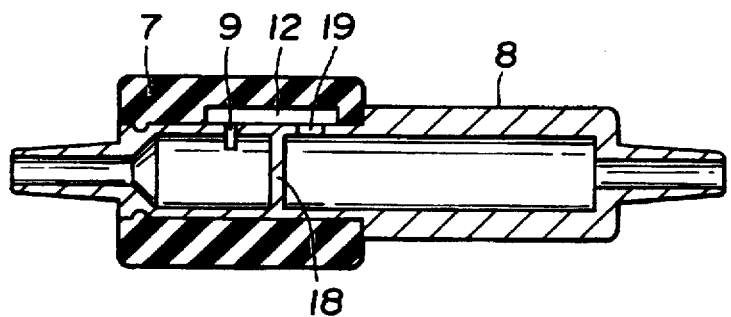
FIG. 6 is a sectional view of the air flow rate regulation apparatus according to a fifth embodiment of the present invention.

FIG. 6 shows a fifth embodiment of the present invention. Whereas all the foregoing embodiments (first to fourth embodiments) employ the indirect regulation method which discharges air from the inflow port 5 through the regulation recess 12 from the discharge opening 13, the fifth embodiment of FIG. 6 employs the construction wherein a partition 18 is disposed at the center of the hollow chamber 17 of the control member so as to divide the chamber into two portions, the regulation hole 9 is disposed on the side of the inflow port 5 and a relatively large through-hole 19 communicating with the regulation recess 12 is disposed the opposite side to the regulation hole 9. Since the discharge opening 13 is not provided to the regulation recess 12 of the regulation member 7, the whole volume of air from the inflow port 5 is discharged from the outflow port 6 through the regulation hole 9, the regulation recess 12, the through-hole 19 and the other side of the hollow chamber 17. Accordingly, direct throttle adjustment and closing of flowing air can be carried out by turning the regulation member 7.

Incidentally, the control member 8 equipped with the inflow port 5, the outflow port 6, the hollow chamber 17 and the through-hole 19 is shown as unitary constituent components in FIG. 6, but ordinarily, two or more components separately made are integrated by bonding means, etc. and used.

Figure 13A:
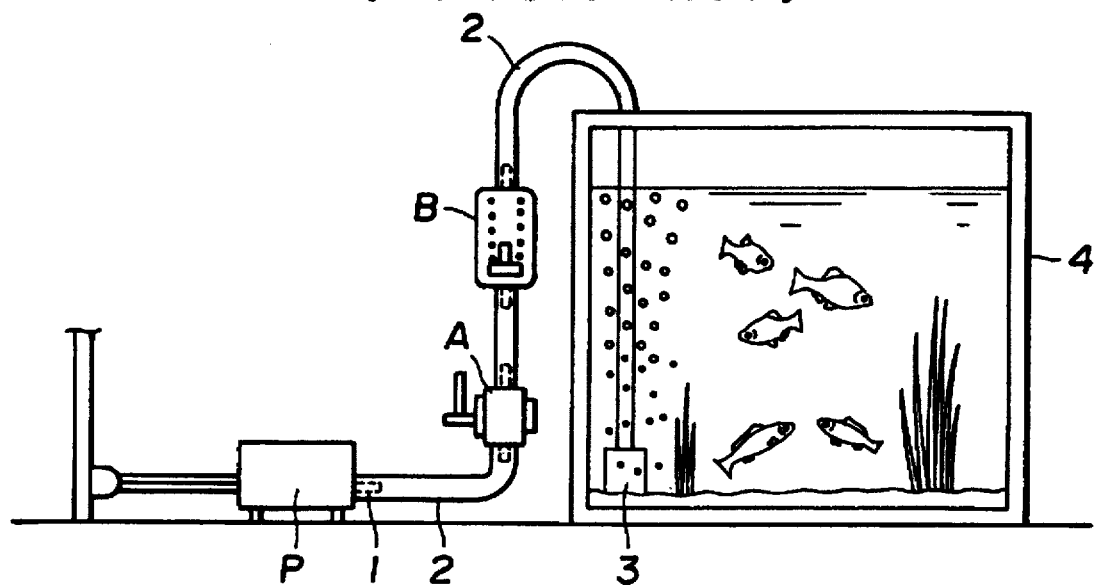
Figure 13B:
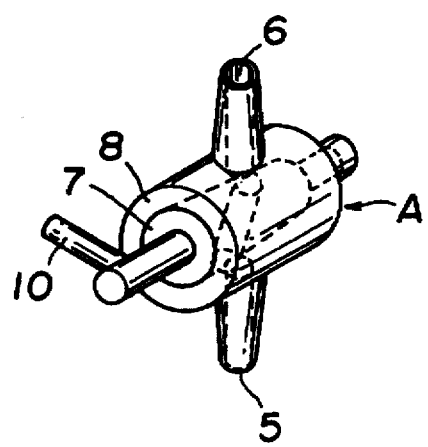
Figure 13C:
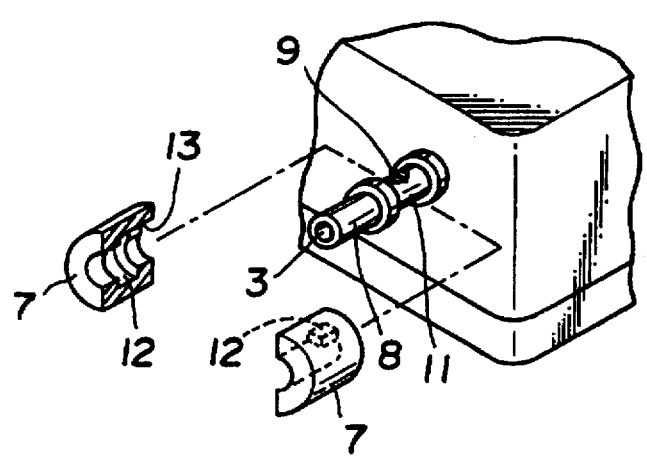

Each of the foregoing embodiments represents the state where the air flow rate regulation apparatus A is used while being disposed at an intermediate portion of the tube 2, but it is also possible to use the discharge port 3 of the air pump as the control member 8 by fitting the regulation member 7 over its outer peripheral surface 11 in the same way as in the prior art example shown in FIG. 13C.

As described above, the overlapped area of the regulation hole 9 formed in the control member 8 and the regulation recess 12 formed in the regulation member 7 can be continuously increased and decreased over the rotating angle of 90° or more at the intermediate portion up to a point where air discharged from the air pump is finally discharged and consequently, fine adjustment of discharge air can be carried out easily.

Particularly because the regulation hole 9 is formed as the elongated hole having a small width or as a plurality of small holes linearly bored in the surface of the control member 8 in the axial direction and the regulation recess 12 is so shaped in the inner peripheral surface 14 of the regulation member 7 into the triangle as to overlap with the regulation hole 9, substantially the entire periphery of the control member 8 other than the width of the regulation hole 9 can be used as the regulation range, and fine adjustment can be further made.

FIGS. 7 to 12 show structural examples wherein the air flow rate regulation apparatus A of the foregoing embodiments is additionally provided with the back flow prevention function. When air discharged from the air pump stops and when the air pump is positioned at a position lower than the water level in this case, these embodiments include a device for preventing the back flow of water of the tank. As to the back flow prevention function, it is customary to employ the construction wherein a separate back flow prevention device B is fitted on the downstream side of the air flow rate regulation apparatus A as represented by the prior art example shown in FIG. 13A.

Figure 7:
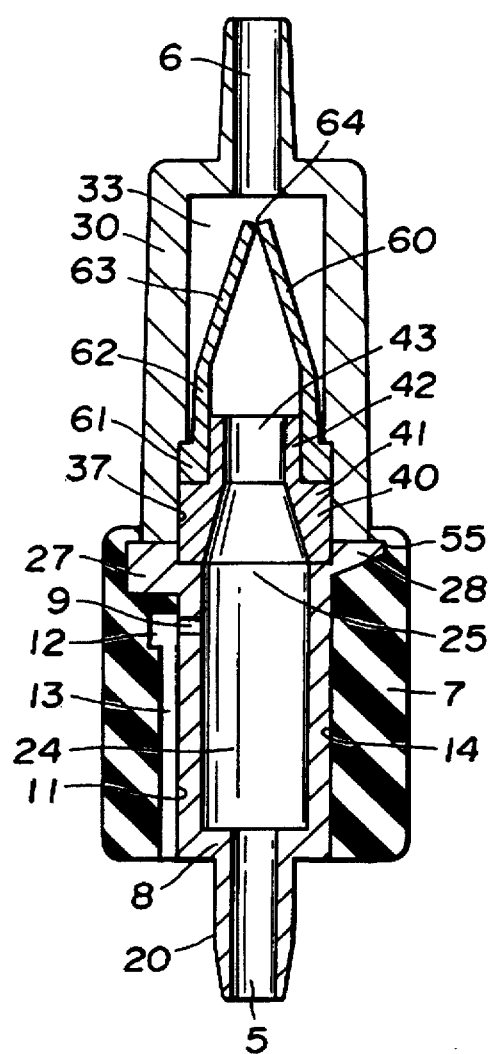
FIG. 7 is a sectional view of the air flow rate regulation apparatus with a built-in back flow prevention device according to a sixth embodiment of the present invention.
Figure 8:
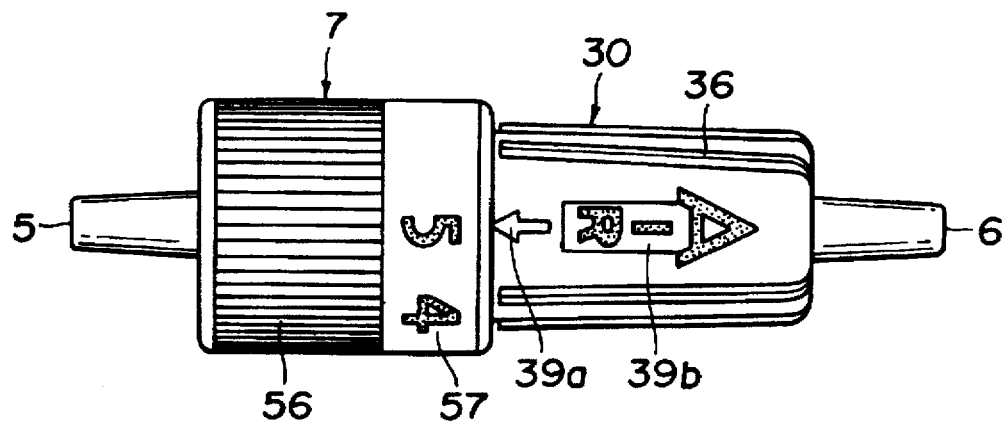
FIG. 8 is a side view of the air flow rate regulation apparatus equipped with a built-in back flow prevention device shown in FIG. 7.
Figure 9:
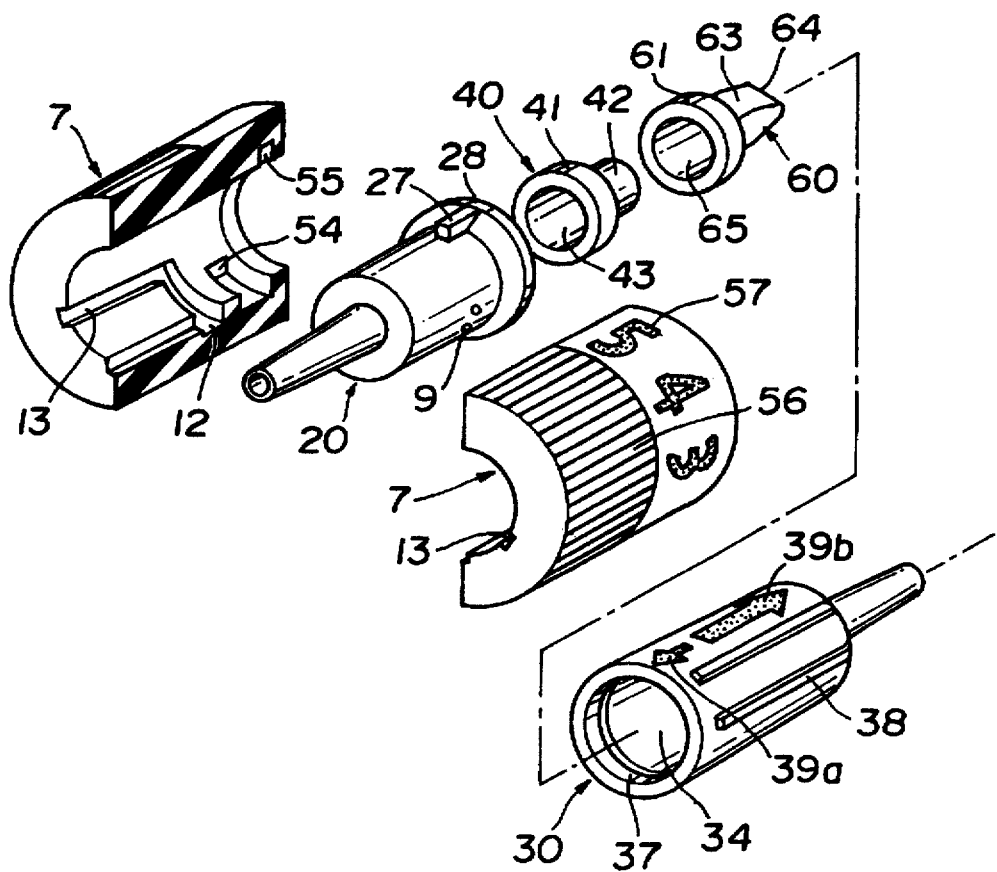
FIG. 9 is an exploded perspective view of the air flow rate regulation apparatus equipped with a built-in back flow prevention device shown in FIG. 7.

In FIGS. 7 to 9 showing the sixth embodiment of the present invention, a part of the control member 8 molded into a cylindrical shape from a synthetic resin is used as a main case 20. One of the ends of the main case 20 defines the inflow port 5, which is connected to the tube 2. The inside of the main case 20 is used as an inflow hollow chamber 24 having a cylindrical shape. The other end of the main case 20 defines an opening 25. This main case 20 is coupled with a sub-case 30 which will be described.

The regulation hole 9 consisting of a plurality of small holes, for regulating the discharge air volume is formed in the outer peripheral surface 11 of the main case 20 in the circumferential direction in such a manner as to penetrate through the inflow hollow chamber 24. A protruding wall 27 and a flange wall 28 are so formed on the portion of the outer peripheral surface 11 near the opening 25 as to protrude from the outer peripheral surface 11. The protruding wall 27 restricts the rotation of the regulation member 7 in cooperation with a necessary portion of the regulation member 7, which will be later described above, and the flange wall 28 prevents mutual fall-off when the regulation member 7 is fitted to the main case 20.

The sub-case 30 is disposed on the opening (25) side of the main case 20 constituting a part of the control member 8. The sub-case 30 is obtained by molding a synthetic resin into a cylindrical shape. The outflow port 6 to be connected to the tube is formed at one of the sub-case 30, and the inside of the sub-case is used as a cylindrical outflow hollow chamber 33. The other end of the sub-case 30 defines an opening 34 (see FIG. 9). The inner peripheral open portion restricts the movement of a valve 50 and defines a step portion 37 for fitting an intermediate cylindrical member 40.

A corrugation 38 for preventing the slip during the for operation of the control member 8, an indication mark 39a for representing the flow rate of the regulation member 7 and a direction mark 39b for representing the air passing direction are disposed on the outer peripheral surface of the sub-case 30. The openings 25 and 34 of the main case 20 and of the sub-case 30 serve as the joint surface when they are assembled as the control member 8.

The intermediate cylindrical member 40 is obtained by molding a synthetic resin into a cylindrical shape. It is clamped tightly between the main case 20 and the sub-case 30. Its outer peripheral surface on the main case (20) side is a large diameter portion 41 to be fitted to the step portion 37 described above, and the outer peripheral surface on the sub-case (30) side is a reduced diameter portion 42 to which the check valve 60 is tightly fitted. The center portion serves as a through-hole 43 while leaving a required thickness.

The regulation member 7 is obtained by molding a flexible material into a cylindrical shape in the same way as the embodiment described above. An inner peripheral surface 14 which is fitted air-tight over the outer peripheral surface 11 of the main case 20 is shaped into a cylindrical shape.

The regulation recess 12 is formed on the inner peripheral surface 14 in the positional relationship such that when the regulation member 7 is fitted to the control member 8, the regulation recess 12 opposes all of a plurality of regulation holes 9 disposed in the outer peripheral surface 11 of the main case 20. Further, a plurality of discharge openings 13 opening to the atmosphere are formed at the end portion of the main case 20 in the direction of the inflow port 5 in such a manner as to continue from the regulation recess 12.

Reference numeral 54 denotes a restriction groove. When the regulation member 7 is fitted and rotated, the restriction groove engages with the protruding wall 27 of the main case 20 and restricts the rotation of the regulation member 7 to within a predetermined range. Reference numeral 55 denotes a flange groove. The flange groove 55 fits to the flange wall 28 of the main case 20, guides the rotation of the regulation member 7 and prevents fall-off between the main case 20 and the regulation member 7.

A knurling 56 for preventing the slip at the time of operation and a flow rate display 57 for indicating the degree of the flow rate in cooperation with the indication mark 39a of the sub-case 30 are disposed on the outer peripheral surface of the regulation member 7 on its inflow port (5) side, in the desired forms, respectively.

In the embodiments shown in the drawings (FIGS. 7 to 9), the check valve 60 as the back flow prevention device includes a cylindrical flange 61 made of a flexible material such as a rubber, a cylindrical drum 62 continuing from the flange 61, a conical triangular pyramid 63 having triangular opposed surfaces, a valve port 64 formed by cutting the apex of the pyramid 63 and a ventilating hole 65 extending along the outer shape of the center portion.

Next, the assembly of the components described above will be explained. The ventilating hole 65 on the flange (61) side of the check valve 60 is fitted over the reduced diameter portion 42 of the intermediate cylindrical member 40 and is tightly inserted into the step portion 37 of the outflow hollow chamber 33 of the sub-case 30. In consequence, the check valve 60, the intermediate cylinder member 40 and the inner peripheral surface of the outflow hollow chamber 33 are set air-tight.

The components described above are brought into the joint state in accordance with the fitting instruction guide (not shown) disposed on the sub-case 30 and on the main case 20, and are fixed air-tight by ultrasonic fusion or using an adhesive.

Next, the flange groove (55) side of the regulation member 7 is gradually inserted to the outer peripheral surface 11 from the inflow port (5) side of the main case 20 until the end portion of the regulation member 7 butts against the flange wall 28. As the regulation member 7 is further pushed in, the regulation member 7 expands and rides over the flange wall 28, so that the flange groove 55 and the flange wall 28 fit to each other, the main case 20 and the regulation member 7 are now rotatable, and their fall-off is prevented. The protruding wall 27 and the restriction groove 54 fit to each other at this position, too, and their rotation beyond a predetermined angle is inhibited. At the same time, the positional relationship at this time is such that the overlapped area of the regulation hole 9 and the regulation recess 12 is zero, or becomes maximum at the lowest position.

The mode of use of the air flow rate regulation apparatus equipped integrally with the back flow prevention device is the same as that of the prior art example shown in FIG. 13A (with the proviso that the back flow prevention device B is omitted). In other words, when the tube extending from the discharge port of the air pump is connected to the inflow port 5 of the main case 20, air is introduced from the inflow port 5 into the inflow hollow chamber 24 and 1s emitted by the bubbler 3 into water inside the tank through the through-hole 43 of the intermediate cylinder 40, the valve port 64 of the check valve 60, the outflow hollow chamber 33 of the sub-case 30 and the outflow port 6.

When the flow rate display 57 and the indication mark 37 exist at the position representing the maximum volume, the full volume of air flows from the through-hole 43 to the outflow port (6) side through the valve port 64 of the check valve 60 and the outflow hollow chamber 33 without passing through the regulation recess 12 and the regulation hole 9.

Next, as the regulation member 7 is rotated, the regulation recess 12 partly overlaps with the regulation hole 9, and part of air is discharged outside from the regulation recess 12 and the discharge groove 13 continuing from this recess 12. Accordingly, the volume of air to the outflow port 6 decreases.

Further, as the regulation member 7 is rotated, the regulation recess 12 fully overlaps with the regulation hole 9 and at the same time, one of the ends of the restriction groove 54 engages with the protruding wall 27 and stops rotation. Because air is discharged to the outside in the maximum volume, the volume of air from the outflow port 6 becomes very small or stops.

The volume of air can be increased by carrying out the operation described above reversely. In either the increase or decrease process, the change of the air volume can be made continuously over a broad range of the rotating angle.

Figure 10:
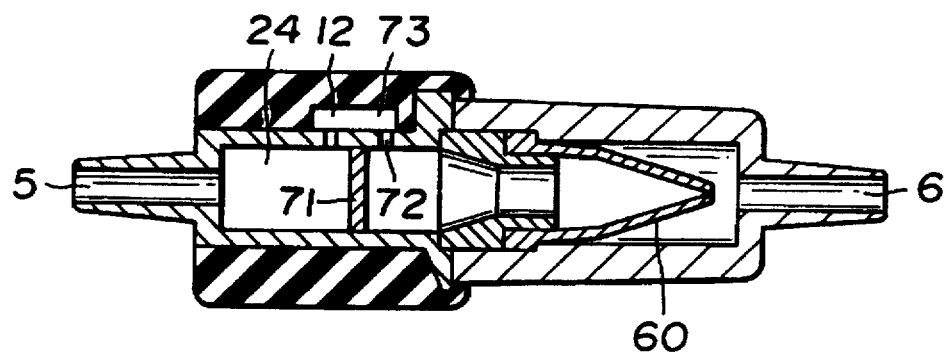
FIG. 10 is a sectional view of the air flow rate regulation apparatus equipped with a back flow prevention device according to a seventh embodiment of the present invention.

FIG. 10 shows a seventh embodiment of the present invention, and the different portion from the embodiment shown in FIG. 8 and the operation state will be explained.

The different portion of the main case 20 resides in that a partition 71 is disposed between the regulation hole 9 and the opening 25 at the position halving the inflow hollow chamber 24, and a through-hole 72 is bored in the outer peripheral surface 11 of the inflow hollow chamber 11 close to opening (25) side.

On the other hand, a ventilating groove 73 is disposed at the extension portion of the regulation recess 12 in the regulation member 7 in place of the discharge groove 13. The regulation recess 12 and the regulation hole 9 have the same positional relationship as in the sixth embodiment of FIG. 7, but they have the positional relationship with the through-hole 72 such that air can be passed always within the rotating range of the regulation member 7. Incidentally, the sequence of the positions of the regulation hole 9, the through-hole 72, the regulation recess 12 and the ventilating groove 73 with respect to the partition 71 may be reversed.

According to the construction described above, inflow air entering the inflow chamber 24 is cut off by the partition 71 and the full volume of air passes through the regulation hole 9. Accordingly, air passes through the regulation recess 12, the ventilating groove 73 and the through-hole 72 and enters the other side of the inflow hollow chamber 24. Thereafter, air is discharged through the same path as that of the sixth embodiment of FIG. 7, and the air volume can be changed continuously over a broad rotating angle by rotating the regulation member 7.

Accordingly, because inflow air is not discharged to the outside before it reaches the outflow port 6, the full pressure of the air pump can be utilized, and the present invention is effective particularly for a deep water tank.

Figure 11:
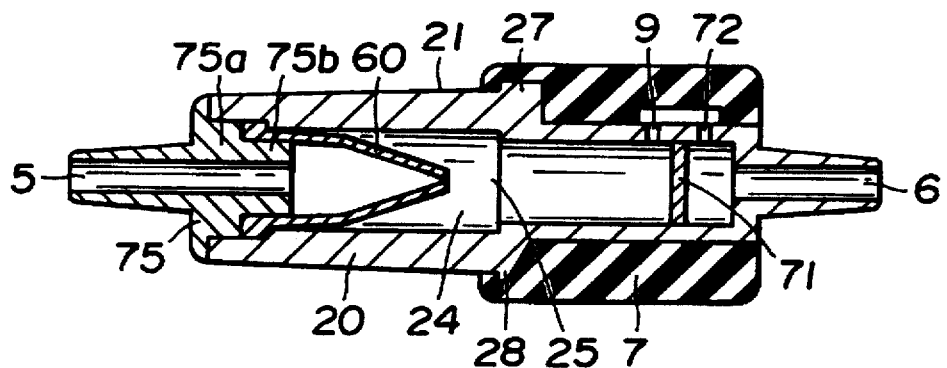
FIG. 11 is a sectional view of the air flow rate regulation apparatus equipped with a built-in back flow prevention device according to the eighth embodiment of the present invention.

FIG. 11 shows the eighth embodiment of the present invention, and the different construction from the sixth embodiment will be explained. In this embodiment, the back flow prevention device (check valve 60) is disposed on the outflow port (5) side, the regulation member 7 is disposed on the outflow port (6) side, and the intermediate cylinder member (reference numeral 40 in FIG. 7) is omitted.

One of the ends of the main case 20 defines the opening 25, the center portion is used as the inflow hollow chamber 24 and the other end defines the outflow port 6. The partition 71 is disposed inside and in the proximity of the outflow port 6. The protruding wall 27, the flange wall 28, the regulation hole 9 and the through-hole 72 are formed on the outer peripheral surface 11. Reference numeral 75 denotes an inflow port member, which includes a large diameter portion 75a fitted to the inflow port 5 and to the main case 20 and a reduced diameter portion 75b to which the check valve 60 is fitted. The inflow port member 75 having the check valve 60 fitted thereto is fixed to the main case 20, and the regulation member 7 Is rotatably fitted to the main case 20. In this way, assembly is completed. One of the ends of the main case 20 defines the Inflow air from the inflow port 5 first passes through the ventilating hole 65 of the check valve 60 (see FIG. 9), then enters the inflow hollow chamber 24, and is discharged in a predetermined volume from the outflow port 6 through the regulation hole 9, the regulation recess 12 and the through-hole 72 due to the rotating operation of the regulation member 7.

Figure 12:
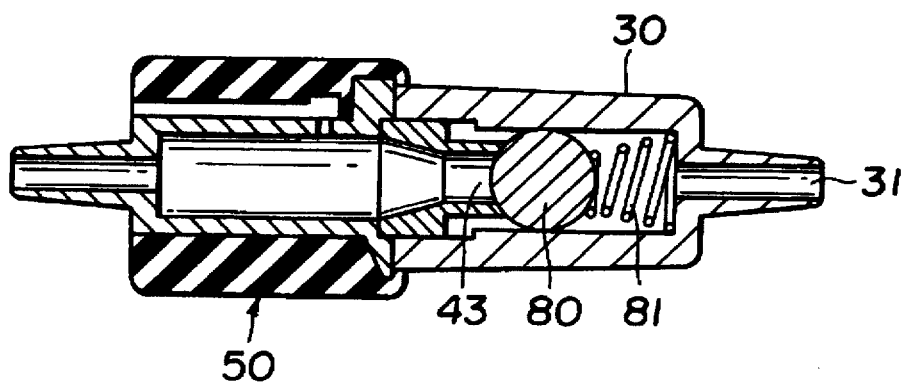
FIG. 12 is a sectional view of the air flow rate regulation apparatus equipped with a back flow prevention device according to the ninth embodiment of the present invention.

FIG. 12 shows the ninth embodiment of the present invention, which uses as a back flow prevention device a sphere 80 and a coil spring 81 in place of the check valve 60. In this embodiment, the coil spring 81 having a conical shape is seated on the outflow port (6) side of the sub-case 30 and the sphere 80 is held under the gently pushed state between the apex of the spring and the through-hole 43 of the intermediate cylinder member 40. Accordingly, the sphere 80 is pushed back in proportion to the pressure of inflow air against the pressure applied by the coil spring 81 and air is discharged from the outflow port 6. A predetermined volume of air is increased or decreased and is discharged by the rotating operation of the regulation member 7.

As described above, the volume of discharge air can be increased or decreased mainly by the change of the overlap area by the regulation hole of the main case and the regulation recess of the regulation member in the air passage ranging from the inflow port to the outflow port, and back flow of water of the tank at the time of the stop of air discharge is prevented by the back flow prevention device. This construction is simple, and causes fewer troubles. Further, being a unitary structure, the construction of high practical utility makes the tube connecting operation easy, and offer high operability and excellent appearance.

What is claimed is:

1. An air flow rate regulation apparatus for regulating a flow rate of discharge air of an air pump used for keeping aquarium fishes, comprising;

a cylindrical control member having a hollow chamber thereinside and a regulation hole bored in an outer peripheral surface thereof, and a cylindrical regulation member having a regulation recess overlapping with said regulation hole and made of a flexible material, wherein said regulation member is rotatably fitted over the outer peripheral surface of said control member in such a manner as to be capable of adjustably covering said regulation hole, and said control member and said regulation member are rotated relative to each other so as to increase or decrease an overlapped area of said regulation hole and said regulation recess so that the overlapped area can be increased or decreased continuously over a range of the rotating angle of at least 90° of said control member and said regulation member.

2. An air flow rate regulation apparatus according to claim 1, wherein said regulation hole comprises an elongated hole having a small width and formed in the outer peripheral surface of said cylindrical control member in the circumferential direction and said regulation recess has the shape of an elongated groove formed on an inner peripheral surface of said regulation member in a circumferential direction in such a manner as to overlap with said regulation hole.

3. An air flow rate regulation apparatus according to claim 1, wherein said regulation hole comprises an elongated hole having a small width and formed in the outer peripheral surface of said control member in an axial direction and said regulation recess is formed in the shape of a triangle in an inner peripheral surface of said regulation member in such a manner as to overlap with said regulation hole.

4. An air flow rate regulation apparatus according to claim 1, wherein a back flow prevention device having a check valve is fitted to an outflow port side inside said control member.

5. An air flow rate regulation apparatus according to claim 1, wherein a back flow prevention device having a check valve means is fitted to an inflow port side inside said control member.

6. An air flow rate regulation apparatus according to claim 1, wherein said regulation hole comprises a plurality of small holes formed linearly and said regulation recess has the shape of an elongated groove formed on an inner peripheral surface of said regulation member in a circumferential direction in such a manner as to overlap with said regulation hole.

7. An air flow rate regulation apparatus according to claim 1, wherein said regulation hole comprises a plurality of small holes formed linearly and said regulation recess is formed in the shape of a triangle in an inner peripheral surface of said regulation member in such a manner as to overlap with said regulation hole.

8. An air flow rate regulation apparatus for regulating a volume of air discharged from an air pump used for keeping aquarium fishes, comprising:

a cylindrical control member having a hollow chamber thereinside and a regulation hole formed in an outer peripheral surface thereof; and a cylindrical regulation member having an inner peripheral surface coming into contact with the outer peripheral surface of said control member, having a regulation recess in the inner peripheral surface thereof and made of a flexible material;

wherein:

said regulation member is rotatably fitted over the outer peripheral surface of said control member so as to cover said regulation hole; and said control member and said regulation member are rotated relative to each other through a rotating angle of at least 90° so as to continuously increase or decrease an overlapped area of said regulation hole and said regulation recess so that a part of the air can be discharged to the atmosphere from a discharge opening disposed in said regulation recess to change the volume of air discharged from an outflow port and the final discharge volume of air can thus be regulated.

9. An air flow rate regulation apparatus for regulating a volume of air discharged from an air pump used for keeping aquarium fishes, comprising:

a cylindrical control member having a hollow chamber defined thereinside and a regulation hole and a through-hole bored in an outer peripheral surface thereof, and having further a partition disposed between said regulation hole and said through-hole at the center of said hollow chamber; and a cylindrical regulation member having an inner peripheral surface coming into contact with the outer peripheral surface of said control member, having a regulation recess formed in the inner peripheral surface thereof, and made of a flexible material;

wherein:

said regulation member is rotatably fitted over the outer peripheral surface of said control member in such a manner as to cover said regulation hole; and said control member and said regulation member are rotated relative to each other through a rotating angle of at least 90° so as to continuously increase or decrease an overlapped area of said regulation hole and said regulation recess so that the volume of air passing through said through-hole can be increased or decreased and the final discharge volume of air can thus be regulated.

* * * * *

UNITED STATES PATENT AND TRADEMARK OFFICE
CERTIFICATE OF CORRECTION

PATENT NO. : 5,669,410
DATED : September 11, 1997
INVENTOR(S) : Shouichi FURUYA

It is certified that error appears in the above-indentified patent and that said Letters Patent is hereby corrected as shown below:

Please change the information of the assignee to indicate a 50% interest as shown below:

After "Toshiro Shimizu", insert -- ( part interest ) --.

Signed and Sealed this

Nineteenth Day of May, 1998

Attest:

BRUCE LEHMAN

Attesting Officer

Commissioner of Patents and Trademarks